June 27, 1961  L. C. HOUSE  2,990,050
CONVEYOR MECHANISM
Filed Oct. 3, 1958  3 Sheets-Sheet 1
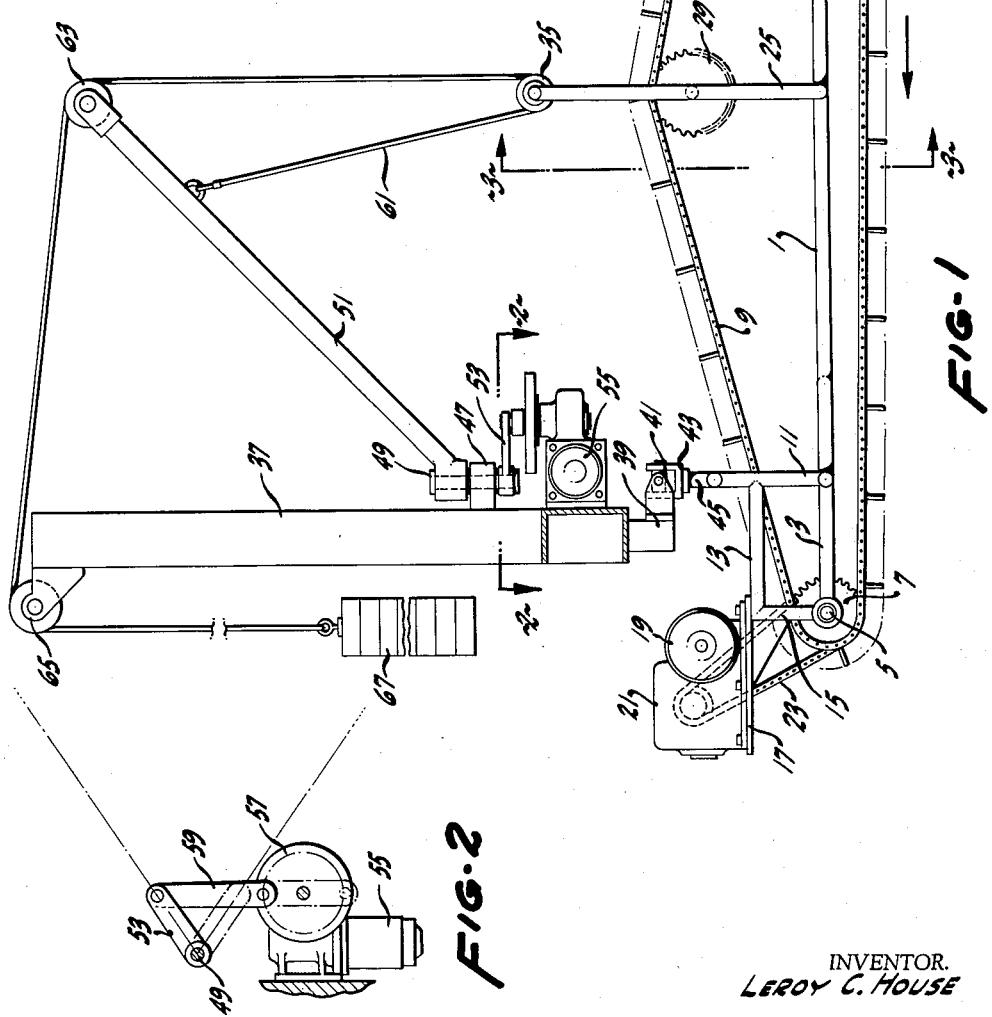
INVENTOR.
LEROY C. HOUSE
BY
Lippincott, Smith & Ralls
ATTORNEYS

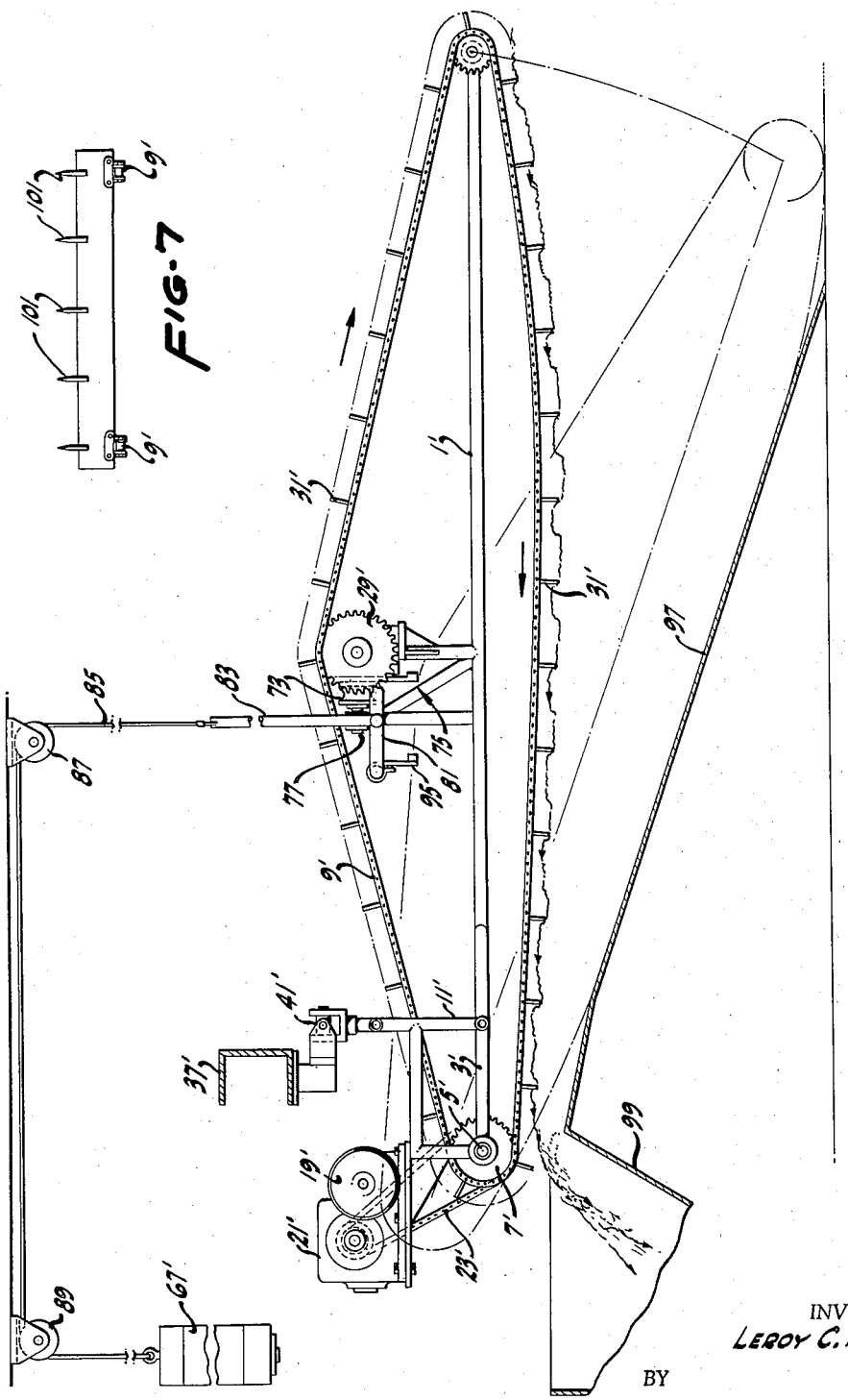

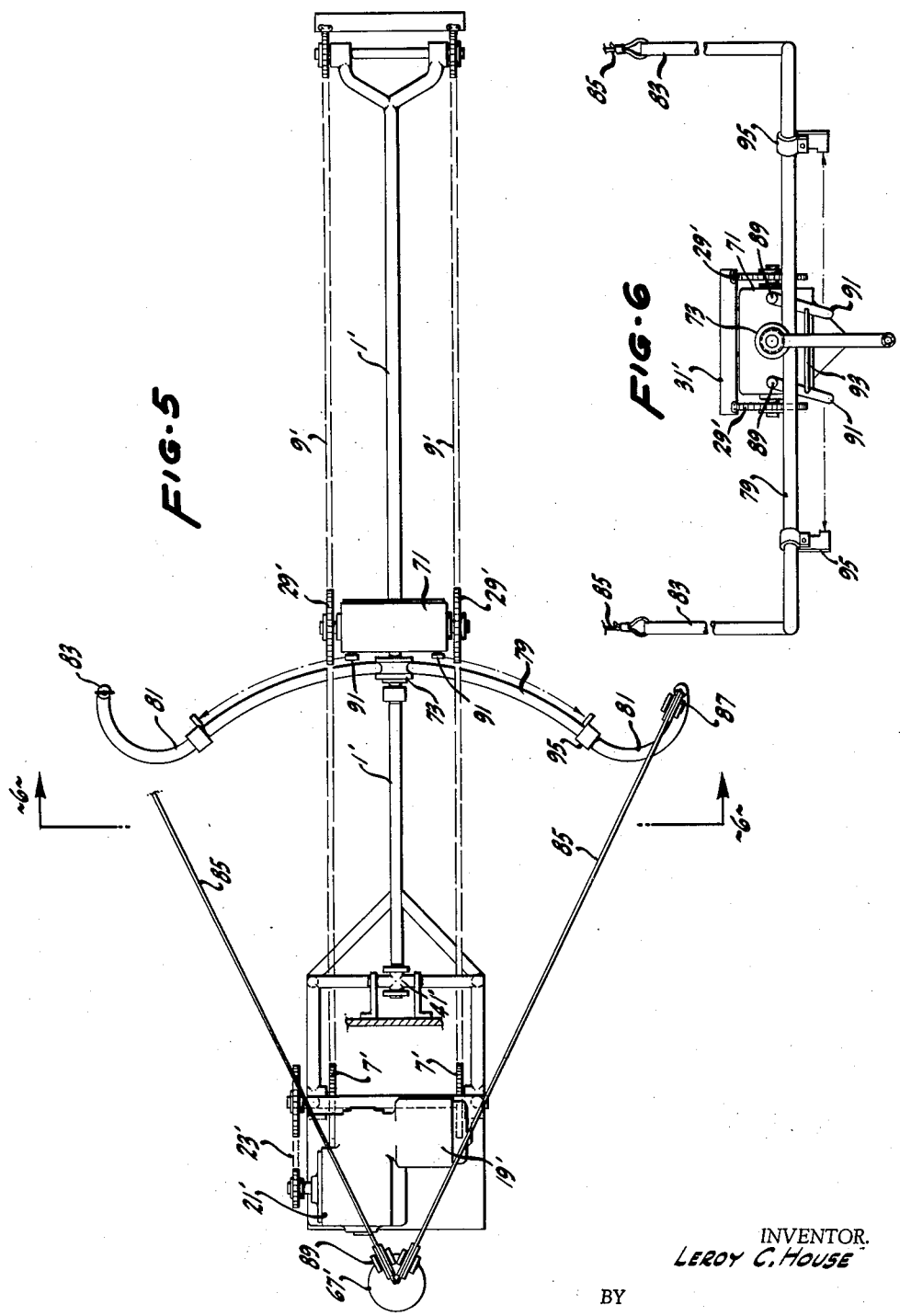

United States Patent Office 2,990,050
Patented June 27, 1961

1

2,990,050
CONVEYOR MECHANISM
Leroy C. House, 215 N. Ivy St., Medford, Oreg.
Filed Oct. 3, 1958, Ser. No. 765,088
2 Claims. (Cl. 198—119)

This invention relates to conveyor mechanisms for transferring loose materials from a storage area to a single point of delivery.

In woodworking operations, such as sawmills, furniture mills and the like, a large part of the material worked upon goes to waste, as sawdust, chips, or shavings. In lumber mills, where the raw materials are logs, there are also slabs cut from the logs in squaring them. In their form as slabs, they have very little utility. Quite generally, they are fed to "hoggers" and reduced to large, irregular chips, which are sometimes used or sold as "hog fuel."

In some operations this waste is transformed into useful by-products; various types of woodboard or wallboard is made from them, sometimes they are pressed with binders into artificial logs for burning in fireplaces or the like. At the present time it is much more usual to burn the wastes, either in burners intended to dispose of a product that would otherwise be a nuisance or, in other cases, as fuel to supply the necessary energy for running the mill. Quite generally there is an excess of waste over what would be required for the latter purpose. In lumbering areas such excess is often sold for fuel. When wastes are reduced to any of these forms—sawdust, "hog fuel" or particles of intermediate size, the result is large volumes of loose materials which take up important storage room and is generally quite hard to handle. Whether it is used upon the spot, sold, or merely destroyed, it must almost always be gathered at some kind of a delivery point, whether this be the fire doors of a furnace or a vehicle for carrying it away.

The present invention is particularly designed for the handling of such wood products, although, as will be seen, it is quite adapted to handle other materials of generally similar character; e.g., coal in small sizes, such as pea or slack coal, sand or gravel.

Among the objects of the present invention are to provide a conveyor mechanism particularly adapted to handle materials of the type described, and one which can be made in large sizes adapted to remove material from piles or storage areas, or can be constructed in moderate or small sizes for feeding furnaces in residences or small size boiler plants, or for loading vehicles for carrying away the material; to provide a conveyor mechanism which will not clog or jam with the material handled, but will feed it in desired amounts at a uniform rate, practically without attention over quite considerable periods, thus making it possible to utilize such wastes as cheap fuels whose economy, if not so handled and fed, would be nullified by the costs of burning it; to provide a conveyor mechanism of the above characteristics that can be adapted for outdoor use, in handling and disposing of piles of waste sawdust or, alternatively, can be installed in relatively small, indoor furnace rooms; and to provide a conveyor mechanism of simple and economical construction which is rugged and which operates with low maintenance and upkeep.

The mechanism of the present invention comprises a long main-frame or spar dimensioned to extend across the storage area, or at least that portion of the storage area from which material is to be fed to a fixed delivery point. A flexible conveyor, which may be either of the belt or chain type, surrounds the main-frame longitudinally, the upper and lower reaches of the conveyor encircling the frame and the conveyor running over wheels—

2 pulleys or sprockets as the case may be—mounted on shafts suitably journaled on each end of the frame. Vanes are mounted at intervals along the entire length of the conveyor, projecting outwardly therefrom. Suitable means for driving the conveyor are also mounted on the frame, such driving means usually being an electric motor, although where electrical power is not available a small internal combustion engine may be used instead.

Adjacent to the delivery point the conveyor is secured to two pivotal connections: first, a vertical one which permits the frame to be swung about it in a horizontal plane; second, a horizontal connection that permits swinging of the frame and its conveyor in a vertical plane. Means, including a suitable counterweight, are provided for supporting the major portion of the weight of the frame, conveyor and driving mechanism, thus permitting the conveyor to rest rather lightly, considering its total mass, upon the loose material which it is to supply, in whatever position it may be with respect to its vertical and horizontal axes. Finally, there is provided means for continuously oscillating the entire frame and its conveyor about its vertical pivotal axis.

The counterweight arrangement which supports the major part of the weight of the conveyor assembly may take any of several forms, the choice depending largely upon the size of the installation and whether the apparatus is intended for indoor or outdoor use, or is designed for relatively wide or narrow storage areas. Where there is sufficient room, the simplest arrangement comprises a boom pivoted approximately above the vertical pivot supporting the conveyor and extending upwardly and outwardly above the latter and carrying, at its outboard end, a pulley over which a cable runs to a second pulley, from which the counterweight hangs directly. The boom can then swing to oscillate with the conveyor, and the cable can always hang down directly from the end of the boom. Where room does not permit the use of a boom, a cable may be attached directly to the main frame, and run diagonally upwardly to a pulley above the vertical axis frame pivot, and thence to the counterweight. This, of course, gives the conveyor assembly a mechanical advantage, requiring heavier cables and counterweights and it, too, becomes impracticable in situations where the ceiling is low in comparison to the span of the conveyor. In these latter circumstances the counterweight cable, instead of being attached directly to the frame, may be brought down vertically from fixed pulleys secured to the ceiling to an arcuate track mounted beneath the frame and between the reaches of the conveyor and upon which the conveyor runs in its oscillatory movement.

These various embodiments and modifications are described in detail in what follows, the descriptions being illustrated in the accompanying drawings, wherein:

FIG. 1 is a side elevation of an embodiment of the invention of relatively small size and light construction, employing a boom for the attachment of the counterweight mechanism, the outer end of the main frame being omitted in this showing as it is substantially identical in construction to the inner end and this omission permitting illustration of other features on a larger scale;

FIG. 2 is a detailed view, taken in horizontal plane, of the mechanism employed for oscillating the conveyor in a horizontal plane, the plane of this figure being indicated by the lines 2—2 in FIG. 1;

FIG. 3 is a detailed sectional view, taken on the lines 3—3 of FIG. 1, showing the yoke whereby the main-frame is connected to the counterweight;

FIG. 4 is a side elevation, similar to FIG. 1, illustrating the arrangement used with a supporting track and further illustrating its preferred mounting for feeding sawdust or like material from a fuel pit into the feed hopper of a furnace;

FIG. 5 is a plan view of the arrangement illustrated in FIG. 4;

FIG. 6 is a sectional view of the embodiment shown in FIGS. 4 and 5, and taken on the line indicated at 6—6 in FIG. 5, and FIG. 7 is a view illustrating one form of vane as employed in the modification of the immediately preceding figures.

In the embodiment of the invention shown in FIGS. 1, 2 and 3, the main frame is formed of welded tubing and comprises a longitudinal stringer 1 which extends nearly the full length of the frame, terminating at each end in a Y or yoke 3, between the forks of which there is journaled a shaft 5 carrying a wheel, in this case a sprocket 7, around which runs a chain conveyor 9. The yoke and sprocket at the outer end of the frame are not shown, being substantially identical with that at the inner end, except for the fact that the one at the inner end also carries a sprocket or pulley through which the conveyor is driven, as will be described below. Attached to the yoke 3 is a vertical frame 11 which passes around the upper reach of the conveyor 9; the riser of the frame 11 supports one end of a horizontal bracket 13 from which redescend vertical end struts 15, having their lower ends welded to the yoke for further support of the bracket. The bracket carries a mounting plate 17 for a motor 19 which, through a reduction gear 21, operates a belt or a chain 23 driving the shaft and sprocket about which the conveyor runs.

Outwardly from the yoke 3 the stringer 1 carries a larger rectangular frame 25, of similar construction to that already described. The frame 25 is more clearly shown in FIG. 3; extending transversely across it is a shaft 27 on which is mounted an idler sprocket 29 over which the upper reach of the conveyor 9 runs. As may be seen from FIG. 3 the conveyor used in this embodiment utilizes a single chain, to which vanes 31 are attached at intervals, these vanes extending quite widely on either side of the conveyor chain and the frame 3 being wide enough to allow these vanes to pass freely through it.

Vertical members of the frame 25 extend above the vanes 31 and are joined by a cross member 33 which carries a pulley 35 about which the supporting cable for the counterweight mechanism, later to be described, is reeved.

The entire assembly as thus far described is suspended from a stationary structure 37. This may be a mast, a gallows frame, or other structure erected specifically for the purpose. In the one installation here shown this structure is a wall, having openings above and below, through which the counterweight cable passes and the delivery end of the conveyor projects. Within the lower opening there is mounted a bracket 39 with an outward-projecting fork. A horizontal stub-shaft 41 across the fork forms a horizontal pivot from which is hung a yoke 43; a short stub-shaft 45 extends upwardly from the center of the frame 11 and is pivoted at the bottom of the yoke, thus serving as a vertical axis or pivotal connection about which the conveyor assembly can be swung in a horizontal plane.

Above the pivotal connection 45 and secured to the permanent structure 37 is a bracket 47. This bracket forms the journal for a vertical shaft 49. A boom 51 extends upwardly and outwardly from the shaft 49 and is securely keyed or otherwise fixed thereto. The lower end of the shaft 49 is similarly connected to a crank 53.

In the apparatus illustrated the oscillation is accomplished by the mechanism illustrated in FIGS. 1 and 2. The horizontally mounted motor 55, operating through a worm gear on a vertical shaft, drives the crank 57. This crank connects through a link 59 to crank 53 and thus oscillates the boom. It will be recognized that this is only one of many arrangements that can be utilized for this purpose.

A cable 61 attached to the boom near its outboard end is reeved about the pulley 35 and thence over another pulley 63 journaled at the end of the boom. From the pulley 63 it extends over a third pulley 65 and thence vertically downward to the counterweight 67. The counterweight is adjusted so that it supports most of the weight of the main frame and its assembly, allowing the conveyor to rest relatively lightly on top of the loose material which it is to carry to a delivery point. Properly adjusted the conveyor shows no tendency to dig down and bury itself in the material it is intended to transport. Instead the tendency is to ride up and over the surface of the loose material, scraping it back toward the delivery point as the lower reach of the conveyor moves in that direction. Meanwhile the conveyor is oscillating from side to side, but the motion is much slower than the motion of the vanes toward the delivery point, even at the outer end of the conveyor. Some material does spill off the ends of the vanes due to the lateral movement but the amount of such spilling is small. The over-all effect is quickly to level off the surface of the storage space and thereafter to feed the material at a constant rate.

The remaining figures of the drawings illustrate a variant form of the apparatus using a larger conveyor, adapted for mounting in a location where the headroom is insufficient to make the use of a boom economical or feasible. In these drawings, numbered as FIGS. 4 to 7 inclusive, parts corresponding generally to those shown in the first three figures are designated by the same reference characters but distinguished by accents.

It should be evident from the drawings that the construction of the main frame itself, means for mounting the main drive motor upon it and its pivotal connections, vertical and horizontal, are so nearly the same as is illustrated in FIG. 1 as to make detailed description thereof unnecessary. The principal difference is that the conveyor 9' is of the double-chain type and hence sprockets 7' are mounted outboard, near each side of the Y's carrying the transverse shafts, instead of centrally of the Y's and the shafts.

The more important difference between the present embodiment and that first described is the method of counterweight suspension and oscillatory drive. In this embodiment the sprockets 29', instead of being idlers, drive a shaft which passes through a gear box 71 containing a substantially conventional reversing gear, which actuates a grooved roller or drive wheel 73. The gear box is mounted on a pedestal of welded construction, generally designated by reference character 75, that includes an outboard bearing 77 and the drivewheel shaft.

The drivewheel 73 rests upon a track 79 which in turn is supported by the counterweight arrangement next to be described.

The track is formed of tubing, preferably steel, bent in the form shown in FIG. 5. A central section, forming the track proper, is in the form of a circular arc having a radius equal to the distance between the pivotal suspension of the main-frame and the roller 73. Ends 81 are recurved in the general form of a classical "Cupid's bow" and are joined to and merge with risers 83 which extend upward, preferably as far as possible without striking the ceiling of the enclosure within which the apparatus is mounted when the outer end of the conveyor is raised to its maximum extent. Preferably the recurved ends 81 extend outwardly to a point where a straight line joining them would cross the stringer 1' midway between the pulley 73 and a line joining the ends of the track proper.

Counterweight cables 85 are attached to the upper ends of the risers 83, run over pulleys 87 on the ceiling of the enclosure and thence convergingly forward over similar pulleys 89 down to a conventional common counterweight 67'.

With the ends 81 of the track brought back to the point specified and the risers 83 coming up from this line, the tilting moment on the track becomes a minimum, whether the frame is on the central portion of the track as shown in FIG. 5 or in one of its extreme end positions along the track and such slight tilting of it as does occur does not interfere with the movement of the frame along it. It will be noted that each cable 85 must be capable of sustaining nearly the entire weight of the structure when the frame is oscillated to its extreme position along the track, the weight transferring from one cable to the other as the frame is oscillated. The counterweight counter-balances the total load irrespective of which cable is carrying the greater percentage of the weight.

In the particular gear box shown reversal of the direction of rotation of the wheel 73 is accomplished by means of a pair of shafts 89, each carrying a lever 91 and the levers being coupled together by a cross-link 93. The track 79 carries a stop 95 at each end of its circular arc. At the end of its travel in either direction levers 91 strike the stop and are reversed by it, driving the frame in the opposite direction until it hits the opposite stop and is again reversed.

The construction of the reversing gear within the gear box shown is not illustrated in detail because numerous reversing gears are known, any one of which is adequate for the purpose here shown. The arrangement of reversing levers and stops may differ in detail between different types of reversing gears but it is within the skill of any good mechanic to adapt such gear boxes for operation as is here described.

A preferred arrangement of the apparatus, when used to feed a hopper is shown in FIG. 4. The fuel pit or storage space is preferably provided with a ramp 97, sloping upwardly toward the discharge point at an angle which approximates the maximum tilt of the conveyor frame when at its lowest position. When the storage space is practically empty the conveyor scrapes the material up this ramp and over the edge into the hopper 99 where it is utilized.

Where the particles of fuel or other loose material to be moved are relatively small the vanes on the conveyors may be simple slats. Where the pieces of material are larger and tend to pack it may be desirable to provide the vanes with outwardly projecting spikes or tines 101. As the conveyor moves forward, carrying the vanes, these move the top layer of the material forward and at the same time the spikes tear up and loosen a lower layer of material to be engaged and carried forward by the vanes at their next trip across the pile.

While a chain conveyor is preferred, as giving a more positive drive and it is therefore shown here, it will be evident that a belt can be used instead without departing from the spirit of the invention. It will also be evident that numerous other modifications in detail of the equipment can be made wihtin the skill of a good mechanic. It is not intended that the scope of the invention be limited to the exact embodiment shown and described in detail, all intended limitations being specifically set forth in the claims that follow.

What is claimed is:

1. A conveyor mechanism for transferring loose materials from an extended storage area to a fixed point of delivery comprising a main frame dimensioned to extend outwardly from adjacent said delivery point across said storage area, an endless flexible conveyor encircling said main frame longitudinally in upper and lower reaches and having vanes thereon extending outward from said frame for engaging the loose material to be transferred thereby, a plurality of shafts journalled on said main frame each having means thereon engaging and supporting said conveyor in rolling fashion, means for driving said conveyor around said main-frame and said shafts with the lower reach thereof moving toward said delivery point, a vertical pivotal connection to said main frame adjacent said delivery point to permit angular motion thereabout in a horizontal plane, a horizontal pivotal connection to said main frame adjacent said delivery point to permit angular motion thereabout in a vertical plane, and means including a single counterweight connected to support a major part of the weight of said main-frame and conveyor in any position while permitting the latter normally to rest on loose material on said storage area and to move about said vertical pivotal connection, said main frame support means including a boom extending upwardly and outwardly from above said vertical pivotal connection and pivoted to swing about a vertical axis concurrently with said main frame, a pulley mounted on the outer end of said boom, and a cable secured to said counterweight and passing over said pulley to said main-frame at a point outward from the pivotal connection thereof.

2. A conveyor mechanism for transferring loose materials from an extended storage area to a fixed point of delivery in accordance with claim 1 and including means for slowly oscillating said main-frame about said vertical pivotal connection.

References Cited in the file of this patent

UNITED STATES PATENTS

| | | |
|---|---|---|
| 304,903 | Brooks | Sept. 9, 1884 |
| 1,259,176 | Volsky | Mar. 12, 1918 |
| 1,332,292 | Gregg | Mar. 2, 1920 |
| 2,496,876 | Kayser | Feb. 7, 1950 |